United States Patent [19]
Cole, Jr. et al.

[11] Patent Number: 5,334,111
[45] Date of Patent: Aug. 2, 1994

[54] SINGLE PIN ROCKER JOINT CVT CHAIN

[75] Inventors: Edward H. Cole, Jr., Utica, Mich.; Philip J. Mott, Dryden, N.Y.

[73] Assignee: Borg-Warner Automotive, Inc., Sterling Heights, Mich.

[21] Appl. No.: 961,077

[22] Filed: Oct. 14, 1992

Related U.S. Application Data

[63] Continuation-in-part of Ser. No. 778,409, Oct. 17, 1991, Pat. No. 5,192,253.

[51] Int. Cl.⁵ ............................................. F16G 13/04
[52] U.S. Cl. ................................. 474/214; 474/229; 474/245
[58] Field of Search ................................ 474/212–216, 474/228, 229, 242, 245

[56] References Cited

U.S. PATENT DOCUMENTS

| | | |
|---|---|---|
| 1,159,163 | 11/1915 | Best .................. 474/229 X |
| 1,496,298 | 6/1924 | Chapman . |
| 1,564,798 | 12/1925 | Sturtevant . |
| 1,644,656 | 10/1927 | Belcher . |
| 1,651,832 | 12/1927 | Morse . |
| 1,769,960 | 7/1930 | Morse . |
| 1,868,334 | 7/1932 | Morse . |
| 1,947,734 | 2/1934 | Perry . |
| 1,951,764 | 3/1934 | Morse . |
| 1,974,338 | 9/1934 | McCann . |
| 2,067,243 | 1/1937 | Perry . |
| 2,266,688 | 12/1941 | Keller . |
| 2,413,843 | 1/1947 | Perry . |
| 2,667,791 | 2/1954 | Bremer . |
| 2,956,442 | 10/1960 | Krekeler . |
| 3,213,699 | 10/1965 | Terepin . |
| 3,340,745 | 9/1967 | McCann .................. 474/214 |
| 3,605,514 | 9/1971 | Mitchell . |
| 3,636,788 | 1/1972 | Jeffrey . |
| 4,337,057 | 6/1982 | Horowitz et al. . |
| 4,342,560 | 8/1982 | Ledvina et al. . |
| 4,507,106 | 3/1985 | Cole, Jr. . |
| 4,737,137 | 4/1988 | Miyaishi .................. 474/245 |
| 4,759,740 | 7/1988 | Cradduck . |
| 4,911,682 | 3/1990 | Ivey et al. . |
| 4,986,799 | 1/1991 | Howlweg . |
| 5,007,883 | 4/1991 | Cole, Jr. et al. . |

FOREIGN PATENT DOCUMENTS

| | | | |
|---|---|---|---|
| 670185 | 11/1929 | France .................. | 474/214 |
| 336379 | 10/1930 | United Kingdom .................. | 474/214 |

Primary Examiner—Ramon S. Britts
Assistant Examiner—Roger J. Schoeppel
Attorney, Agent, or Firm—Willian, Brinks Olds

[57] ABSTRACT

A rocker joint for a power transmission chain is formed from a single pin and an associated link aperture. The pin has a substantially flat front surface and a convex back surface, with the back surface being defined by a plurality of radii. The pin is received in the aperture of the link such that the front surface of the pin engages and rocks on the curved surface of the link aperture. The back surface of the pin is movable in the aperture of the links as the surfaces move relative to one another when the chain articulates.

14 Claims, 5 Drawing Sheets

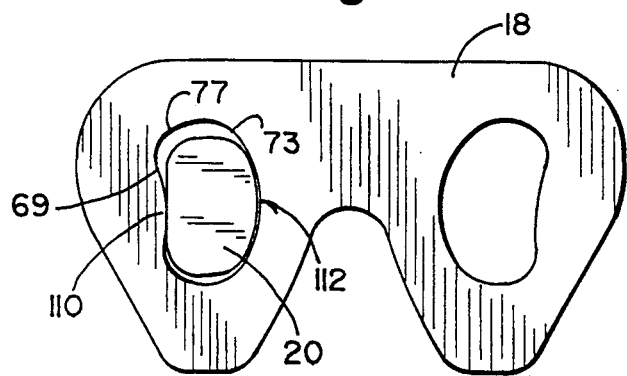
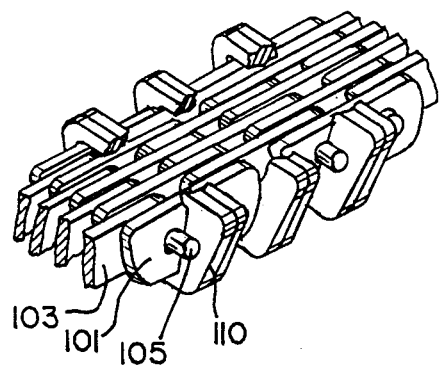
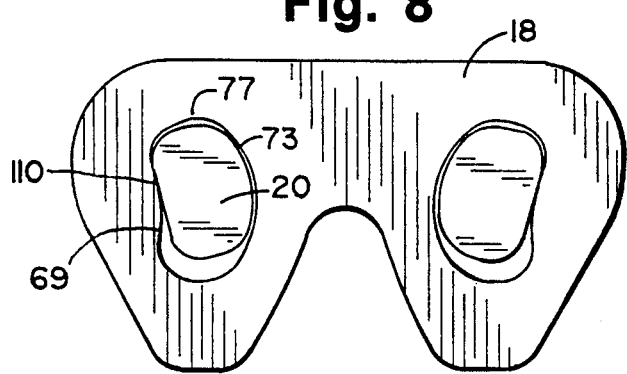
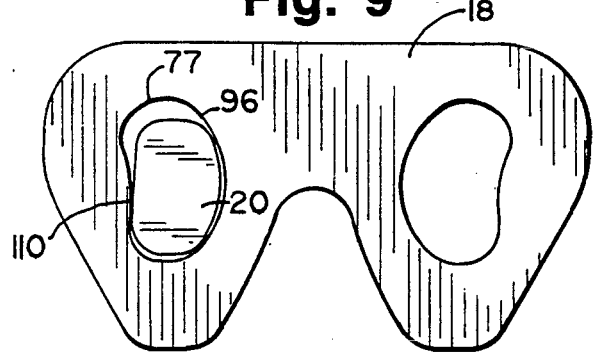
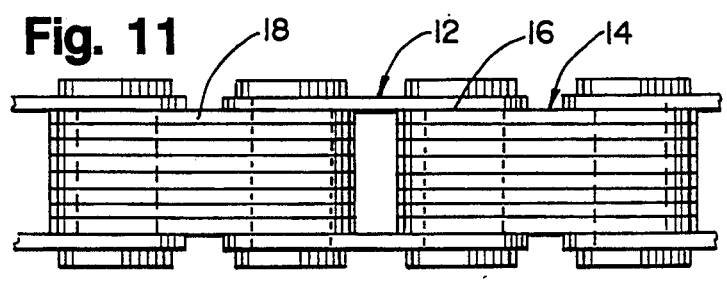

SINGLE PIN ROCKER JOINT CVT CHAIN

This application is a continuation-in-part application of U.S. Ser. No. 778,409, filed Oct. 17, 1991 now U.S. Pat. No. 5,192,253.

BACKGROUND OF THE INVENTION

Reference is made to U.S. application Ser. No. 07/778,402, filed Oct. 17, 1991, to Philip J. Mott, entitled "Single Pin Rocker Joint Bushing Chain," now U.S. Pat. No. 5,192,253 which is related to the subject matter of the present application and is incorporated herein by reference.

1. Field of the Invention

The present invention relates generally to power transmission chains and particularly to an improved rocker joint for such chains. The rocker joint is formed from a single pin and an associated link aperture. The invention has application to power transmission chains of the silent chain variety, as well as power transmission chains for use with variable pulley transmissions (continuously variable transmissions).

2. Description of the Prior Art

Power transmission chains are widely used in the automotive industry. Such chains are used for engine timing drives as well as for the transfer of power from the engine to the transmission, the transfer of power in a transfer case, or the transfer of power within a transmission. Power transmission chains are also widely used in industrial applications.

One type of power transmission chain is referred to as "silent chain". Such chain is formed of interleaved sets of inverted tooth links. A set or rank of links is assembled from several links positioned alongside of or laterally adjacent to each other. Each link has a body with a pair of spaced apertures and the apertures of one set of links are arranged and aligned with the apertures of the next adjacent set of interleaved links. The links have a pair of depending toes separated by a crotch.

The links are connected by pivot means, which are typically round pins received in the link apertures. The pivot means can also comprise a rocker joint, which may include a pin and a rocker. Each pin and rocker has a front face which contact and rock on each other. An example of silent chain is found in U.S. Pat. No. 4,342,560, which is incorporated herein by reference. An example of silent chain which can be used in engine timing applications is found in U.S. Pat. No. 4,759,740, which is also incorporated herein by reference.

A second type of power transmission chain is used to transfer power between a pair of variable pulleys in a continuously variable transmission. The chain links are provided in sets that are interleaved together. The links have aligned apertures for receiving pivot means. The pivot means can provide the means for the transfer of power between the chain and the sheaves of the pulley by allowing the sheaves to directly contact the ends of the pivot means in a driving engagement.

Load blocks or load carrying means that are positioned on the chain between the spaced pivot members can also provide the means for transfer of power between the pulleys. The load blocks can be in the form of struts that are carried in a passageway below the links. Alternatively, the load blocks can extend around the links of the chain and have one or more windows for receiving the chain links therein. The load blocks have tapered outer or end surfaces which engage the sheave faces of the pulleys to provide the driving engagement between the pulleys and the chain. Examples of power transmission chains suitable for use in a continuously variable transmission are shown in U.S. Pat. No. 4,911,682, U.S. Pat. No. 4,507,106, and U.S. Pat. No. 5,007,883, which are incorporated herein by reference.

The present invention relates to an improved rocker joint for power transmission chain. Rocker joints for chains are known in the art. Rocker joints are utilized in an attempt to attain higher efficiencies and less wear than comparable round pin joints. Round pin joints typically produce higher wear as a result of the sliding action between the round pin and the inside of the circular link aperture, as the chain articulates. In contrast, rocker joints provide a lower wear joint on account of the rocking action between the pin and the rocker portion, as the chain articulates.

U.S. Pat. No. 4,507,106 discloses a rocker joint in which, in the preferred embodiment, each pin or rocker has the identical cross-section. Each pin has a front surface which rocks on the front surface of the adjacent pin. In the preferred embodiment, the pins have a front surface defined by a first radius, and a back surface defined by a second and a third radius, both progressively smaller than the first radius. The rocker joint comprises a pair of pins fitted into each group of aligned apertures in the interleaved sets of links to join the links and permit articulation.

U.S. Pat. No. 4,911,682 discloses a rocker joint that includes a pair of pins. The rocker joint has apertures that are a generally hour-glass shape with the enlarged ends receiving the pins. The front surfaces of the pins rock against one another, while the back surfaces of the pins are prevented from substantial rotation by the curvature of the apertures.

These prior art patents represent examples of rocker joints utilizing two pivot members or pins, or a pin and a rocker. The present invention relates to single pin rocker joints in which a single pin rocks against the link aperture. U.S. Pat. No. 2,667,791 discloses a silent chain with a single pin rocker joint. The chain has a single pin with an arcuate periphery, defined by a single radius, and a relatively flat bearing surface. The link has a generally semi-circular aperture with an arcuate bearing surface. The flat surface of the pin rocks against the arcuate surface of the link aperture.

Another type of single pin rocker joint is shown in U.S. Pat. No. 4,337,057. The patent discloses a double unrolling hinge for a chain-belt for a variable pulley transmission. Both sides of the hinge pin contact the insides of the link apertures.

U.S. Pat. No. 1,564,798 also discloses a single pin, double-edged rocking joint. The pin is thicker in the center section than at the top and bottom. The formation of the link aperture allows the sides of the pin to roll against the aperture sides of adjacent, interleaved links.

The present invention provides an improved single pin rocker joint for a power transmission chain. The construction of the pin includes a substantially flat rocking surface and an arcuate surface formed of a plurality of radii. In the silent chain embodiment, a clearance between the back surface of the pin and the associated aperture permits movement of the pin with respect to the aperture. The chain includes inside links and guide links and has application in timing drives as well as drives for continuously variable transmissions.

SUMMARY OF THE INVENTION

In accordance with one embodiment of this invention, a power transmission chain is constructed of an assembly of links and pivot members. The chain includes a plurality of sets of guide links interleaved with sets of inside links. Each guide link and inside link has a pair of spaced apertures. To assemble the chain, the apertures of one link set are transversely aligned with one set of apertures of the next adjacent link set.

The apertures are defined by a series of surfaces. The apertures within the guide links have at least one curved surface and the apertures within the inside links have a plurality of curved surfaces.

Pivot members, in the form of pins, are fitted within the apertures of the links. The pins have a substantially flat front surface and a convex back surface. The pivot member back surface is defined by a first radius. The pivot members are press fit in the apertures of the guide links such that the pivot member back surface engages the curved surface defined by the guide link. The press fit prevents substantial rotation of the pin relative to the guide link.

As a result of a minimal clearance between the back surface of the pin and the associated aperture of the inside links, the back surfaces of the pivot members are allowed to move freely within the apertures of the inside links of the chain. The front surface of the pivot member and a curved surface of the inside link aperture engage and rock on one another with a rolling type action.

The apertures of the inside links are formed by a series of radii. The inside link apertures are rotated with respect to a horizontal centerline of the body of the link in order to provide a positive tilt angle. In contrast, the apertures of the guide links have a flat surface that matches the flat surface of the pin. The flat surfaces of the apertures of the guide links are perpendicular with respect to the horizontal centerline of the link as well as the pitch line of the link. The apertures of the inside links are formed and spaced to provide a pitch length that is greater than the pitch length of the guide links.

The rocker Joint of the present invention may be used in an inverted tooth silent chain or in a power transmission chain for a continuously variable transmission. In the silent chain use, the inside links include a pair of depending teeth that are formed to contact a sprocket for driving of the chain. In the use for a continuously variable transmission, the links include load carrying members in the form of load blocks. The load blocks may extend around the links or through a passageway formed in the base of the links. Alternatively, the pins may contact the pulley sheaves to provide the power transfer.

In the power transmission chain for the continuously variable transmission, the chain includes sets of guide links and sets of inside links. The inside links are links that are in the non-guide rows. The inside links are configured to rotate with respect to the pins. The sets of guide links include pairs of external or flanking guide links which are located on the outside of the rows or sets. The flanking guide links are preferably press fit on the pins. That is, the pins are fit within the apertures of the flanking guide links so that the pins do not rotate with respect to the flanking guide links. Additionally, the internal or non-flanking guide links may be press fit on the pins. In such a chain, the non-flanking guide links also have an aperture configured to match the cross-section of the pin and thus prevent rotation of the guide link with respect to the pin. Alternately, the internal guide links may have apertures that are configured to allow rotation of the link with respect to the pin.

The rocker joint of the present invention, which is used in an inverted tooth (or silent) power transmission chain, may also be used with non-flanking guide links that are press fit. This inverted tooth chain embodiment of the present invention includes flanking and non-flanking (internal) guide links which have an aperture configured to match the configuration of the pivot member. In this embodiment, as well as in the embodiment for use with a continuously variable transmission, the number of links in the non-guide row preferably exceeds the number of links in the guide row.

The use of guide links which are press fit or interference fit with the pins provides a link with increased fatigue strength, in comparison to a link which is not press fit. The use of fewer links in the guide row than in the non-guide (articulating) row reduces the contact stresses in the chain.

The rocker joint of the present invention has use in a timing chain application of inverted tooth links that are laced in a block form. In such a construction, the inside links are substantially identical and placed side-by-side in a row to form a block. Rows or sets of such block laced inside links are preferably alternated with guide link rows. The sets with guide links do not contain any inside links. Similarly, the rocker joint can be used in a continuously variable transmission chain that is laced in block form.

Use of the single pin rocker joint of the present invention provides several advantages over the use of a round pin chain. The rocker joint provides generally higher efficiencies than the round pin joint with lower wear. Moreover, the single pin rocker joint of the present invention presents advantages over the double-pin rocker Joint design of the prior art by its elimination of the additional pin.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 7 is a schematic side view of the inside link and pin illustrating the position of the pin in the link aperture in the straight chain pull position;

FIG. 8 is a schematic side view of the inside link and pin illustrating the position of the pin in the link aperture in the fully articulated position;

FIG. 9 is a schematic side view of the inside link and pin illustrating the position of the pin in the link aperture in the backbend position;

FIG. 10 is a perspective view of a segment of the chain of the present invention for use in a continuously variable transmission, including load block members;

FIG. 11 is a plan view of the chain of the present invention in a block lacing construction;

DETAILED DESCRIPTION OF THE DRAWINGS

Figure 1:
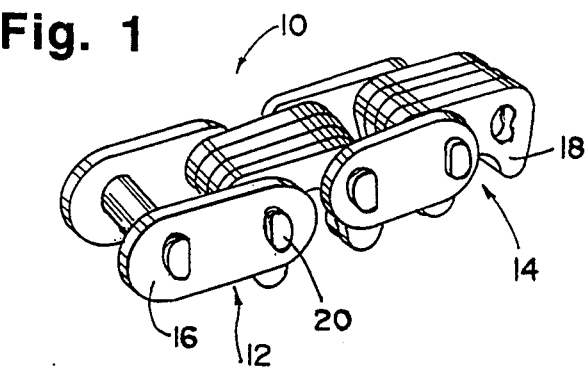
FIG. 1 is a perspective view of a segment of the chain of the present invention, with inverted tooth links and block lacing.

Turning now to the drawings, FIG. 1 illustrates a portion of a power transmission chain generally at 10. The chain includes sets or rows of interleaved links. In the embodiment of FIG. 1, the chain includes guide link rows 12 interleaved with inside link rows 14. The guide link rows are comprised of external or flanking guide links 16, while the inside link rows are comprised of inside links 18. The guide links 16 are shown more clearly in FIG. 4 and the inside links are shown more clearly in FIG. 2. In the preferred silent chain embodiment, the sets of inside links are laced in blocks and the sets of guide links do not include inside links.

The complete chain drive (not shown) includes an endlessly connected chain 10 wrapped about at least a pair of sprockets. The sprockets are mounted on shafts, such as an engine crankshaft or engine camshaft. The sprockets may be of different diameters and may have a different number of differently shaped teeth. The chain and sprocket system can also include an idler sprocket.

Figure 6:
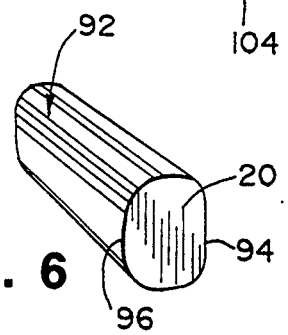
FIG. 6 is a perspective view of the pin of FIG. 5.

The rows or sets of links are formed of a plurality of links placed in side-by-side relationship. The links of the interleaved set are preferably alternated with the links of the first set. The adjacent sets of links are joined by pivot means 20, which are illustrated in FIG. 6 as pins with a flat front working surface and an arcuate back surface. The pivot means are received in aligned sets of apertures 22, 24, 26, 28. Each link preferably includes a pair of apertures located at opposite ends of the link.

In the silent chain embodiments, the flanking guide links 16 maintain the lateral alignment of the chain on the sprockets. The flanking guide links are along the outside of the chain and have no driving engagement with the sprocket teeth. Thus, the guide links are distinguished from the inside links 18, or driving links, by their lack of sprocket tooth contacting members. An inside guide link without sprocket contacting teeth (not shown) may also be used in which case the sprocket is grooved to receive the inside guide link. The pivot means 20 is shaped for a press fit within the apertures 26, 28 of the guide links. In the silent chain embodiment, the pivot means is typically peened over to maintain the integrity of the chain assembly; however, other methods may be used if desirable. In the embodiments of the present invention which have applications with continuously variable transmissions (CVT), the guide links act to secure the pins. Flanking guide links are placed along the outside of the rows of the chain, While other guide links are press fit on the pins and placed on the inside of the rows of the chain.

Figure 4:
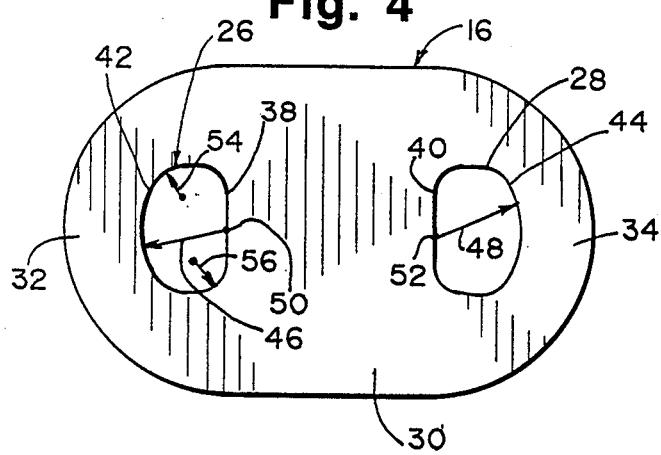
FIG. 4 is a side view of a link form for a guide link used in the chain of the present invention.

The guide links shown in FIG. 4, which lack sprocket tooth contacting members (inverted teeth), are known as flanking guide links. Pairs of flanking guide links are placed on the outside of the chain in the guide rows to maintain the chain on the sprockets. The non-guide rows, which do not have pairs of flanking guide links, have the inside links. The external or flanking guide links are not to be confused with internal or non-flanking guide links. The internal guide links are links that are present in the guide rows. In the silent chain embodiment, the internal guide links include pairs of inverted teeth that are adapted to contact the teeth of a sprocket. The internal or non-flanking guide links may also be press fit on the pins in the guide rows. In the CVT embodiment, the non-flanking guide links include depending tabs which act to form a passageway for a load block.

Figure 2:
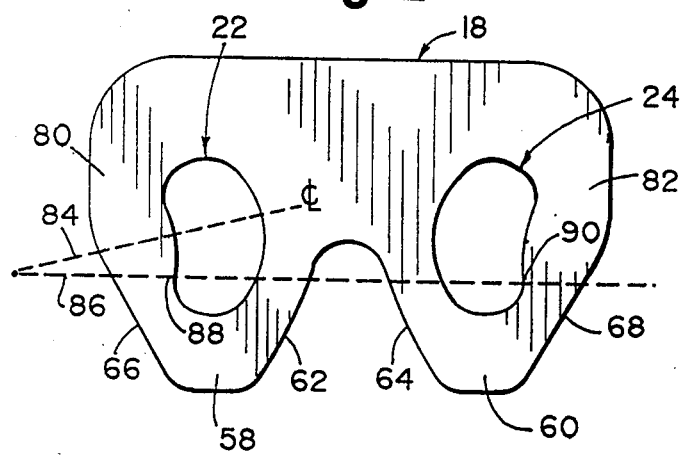
FIG. 2 is a side view of a link form for an inside link used in the chain of the present invention.

In the case where the chain includes internal or non-flanking guide links, the non-flanking guide links may include apertures of the same configuration as the flanking guide links to provide the press fit on the pins. Thus, when the inside link of FIG. 2 is positioned in the guide row as a non-flanking guide link, the link 18 may have apertures 26, 28 of the configuration shown in FIGS. 4 and 5.

The guide link 16 is illustrated in FIG. 4. The guide link 16 is defined by body portion 30 and end portions 32, 34. The guide link apertures have substantially flat surfaces 38, 40, which are both oriented toward the inside body portion 30 of the link. The back surfaces 42, 44 of the apertures are formed by radii 46, 48, which are struck from center points 50, 52. The radii center points 50, 52 are preferably located between the apertures 26, 28, within the body portion of the link. The apertures each contain additional connecting arcs with connecting radii 54, 56, which are shown only for aperture 26. The pitch of the guide link is measured as the distance between the flat surfaces 38, 40 of the apertures, along the pitch line of the link.

Figure 3:
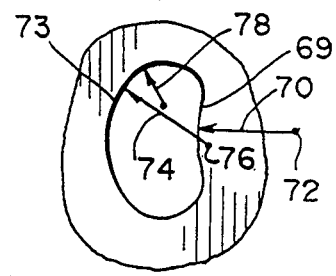
FIG. 3 is a detail of the aperture of the link of FIG. 2.

Inside links 18 are interleaved with the guide links 16. Link 18 is illustrated in FIG. 2 and is defined by a pair of spaced toes 58, 60. The toes are defined by inside flanks 62, 64 and outside flanks 66, 68. The apertures are defined by a plurality of arcs, which are more clearly shown in the detail of FIG. 3. The front surface 69 is formed by an arc of radius 70 which is struck from centerpoint 72. The back surface 73 is formed by an arc of radius 74 which is struck from centerpoint 76. The connecting surfaces 77 are formed by a plurality of arcs, such as the arc struck from radius 78. The radii centerpoints of the apertures of the inside link are preferably located on opposite sides of the apertures, toward the end portions 80, 82 of the link.

The apertures of the inside links are each preferably symmetrical about a centerline. The centerline 84 is shown for the left aperture 22. The right aperture 24 has a similar symmetrical centerline (not shown). The apertures are rotated about the pitch line 86 of the link to form a positive tilt angle.

The preferred aperture tilt angle of the inside link is approximately 6 degrees, which is the angle between the symmetrical centerline and the pitch line of the link. This is in contrast to the guide links 16 which have zero aperture tilt. The pitch length of the inside links is measured along the pitch line, between the points of intersection 88, 90 of the apertures with the pitch line. The pitch points 88, 90 are the points of vertical tangency of the aperture inside front surface. The location of the pitch line in the link is determined by the link tooth form as well as the design of the sprocket. The pitch length of the inside link is greater than the pitch length of the guide link.

Figure 5:
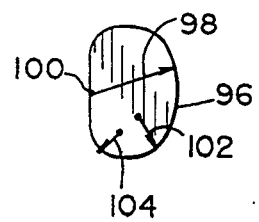
FIG. 5 is a detail of the cross-section of a pin used in the chain of the present invention.

The pin 20 is illustrated in FIG. 6, with the detail of the cross section shown in FIG. 5. The pin includes a body portion 92, which has a substantially flat front working surface 94 and arcuate back surface 96. The back surface 96 is constructed of arcs formed by a plurality of radii. These radii include radius 98, struck from centerpoint 100 and radii 102, 104.

In operation, the movement of the pin 20, of the rocker joint of the silent chain embodiment relative to the links of the chain, is illustrated in FIGS. 7, 8, and 9. FIG. 7 illustrates the pin in the straight-pull position of the chain. In such a position, the chain is extended between two sprockets and the link is being viewed in the tight strand portion of the chain. The rocking contact of the flat front surface of the pin occurs with the front arcuate portion of the aperture at contact point 110. In the straight-pull position of FIG. 7, the rocking contact points are the points of vertical tangency 88, 90, shown in FIG. 2. The rocking occurs along a portion of the flat surface of the pin as a rolling type action. This rolling action is in contrast to the sliding of a round pin within a round aperture of a round pin joint. A small pin-to-aperture clearance is provided at point 112, which is opposite the side of the rocking contact point 110. The minimal clearance at point 112 between the back surface 96 of the pin and the back surface 73 of the aperture allows substantially free movement of the back surface of the pin relative to the link, as the chain articulates. In the straight-pull position, clearance between the pin and aperture on the back surfaces is provided in the tight strand of the chain.

The pin 20 moves relative to the link to the position shown in FIG. 8, where the link is fully articulated. In the fully articulated position, the chain has wrapped around the sprocket and the link is being viewed in a position of being fully seated in the sprocket. Preferably, a minimum clearance between the back surface of the pin and the aperture surface is maintained in this position.

In a timing chain drive application, the chain is provided with a back-bending or flexing ability. In such a motion, the pin 20 moves relative to the link to the position shown in FIG. 9. In this position, the slack side of the chain has been forced to an inward position by a chain snubber and the link is being viewed in the fullest position of backbending.

In the preferred silent chain embodiment, the chain of the present invention is constructed with a block lacing. Such a block lacing is illustrated in FIG. 11. An example of block lacing in silent chain for an engine timing drive is also shown in U.S. Pat. No. 4,759,740. The inside links are substantially identical and placed side-by-side in the row to form a block. Rows or sets of such block laced inside links are preferably alternated with guide link rows. The sets of guide links do not contain any sprocket tooth contacting members. That is, they do not contain any links with depending teeth for sprocket tooth contact.

In the block laced construction, the curved portion of the apertures of the inside links in the block act together to form a continuous curved surface, which is substantially continuous across the width of the chain, for rocking contact with the pin. The inside curved surface of the apertures of the block laced links therefore, effectively, forms a rocker for rocking action against the pin.

The block construction also allows use of the single pin with a single type of inside link. Without the block lacing construction, inside links would be present in the guide link row. To place inside links in the guide row requires a second type of inside link, with the apertures reversed in direction, to permit lacing of the chain. Alternatively, as described above, the inside links may be placed in the guide row as non-flanking guide links. These guide links may be press fit on the pin to prevent rotation of the pin with respect to the link. The press fit is achieved by utilizing the same configuration aperture in the non-flanking guide link as in the flanking guide link, which matches the configuration of the pin. The non-flanking guide links have a pair of depending toes adapted to contact the teeth of a sprocket. In this embodiment, the number of links in the non-guide row preferably exceeds the number of links in the guide row.

The use of guide links which are press fit or interference fit with the pins provides a link with increased fatigue strength, in comparison to a link which is not press fit. The use of a greater number of links in the non-guide row than in the guide (articulating) row reduces the contact stresses in the chain.

The use of the single pin rocker joint of the present invention in the block lacing construction combines the benefits of the block lacing with the benefits of a rocker pin joint. The rocker joint is generally of higher efficiency than a round pin joint of comparable size and has generally lower wear characteristics.

The single pin rocker joint of the present invention can be used with silent chain, as described, or also with a chain used for a continuously variable transmission (CVT). An example of a portion of such a chain is shown in FIG. 10. In such a chain, the power transfer occurs through load block members 110 that either encircle the links or are placed in a passageway beneath the links. The chain in FIG. 10 includes the single pin 105 with the guide links 101 and inside links 103. The inside links in the guide row require apertures that are larger than the apertures in the flanking guide links in order to permit articulation of the links with respect to the pins. The inside link apertures in the guide row would also be in the opposite directions of the apertures of the inside link apertures in the non-guide row. Alternatively, the internal links in the guide row (non-flanking guide links) have apertures of the same shape as the cross-section of the pins. The internal links are preferably not block laced in order to provide support for the load block 110. An example of a power transmission chain for use in a continuously variable transmission, with load block members encircling the links, is shown in U.S. Pat. No. 4,507,106. Alternatively, the power transfer can occur through the pins that contact the pulley sheaves.

Figure 12:
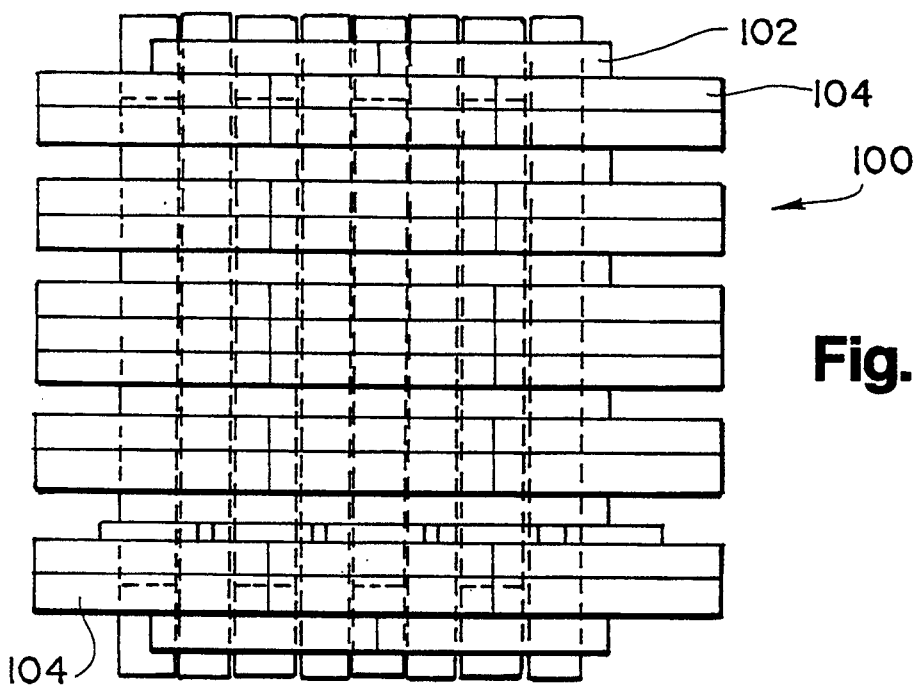
FIG. 12 is a plan view of an embodiment of the chain of the present invention for use in a continuously variable transmission.
Figure 13:
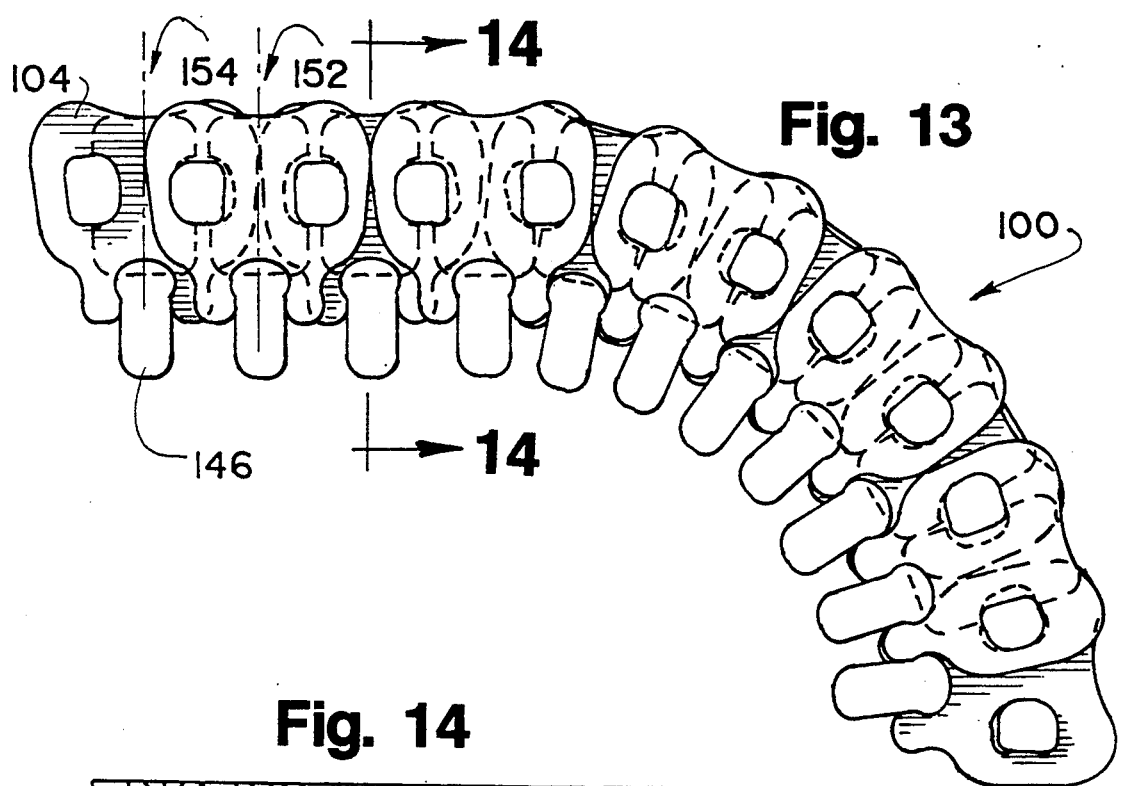
FIG. 13 is a side view of the embodiment of FIG. 12.
Figure 14:
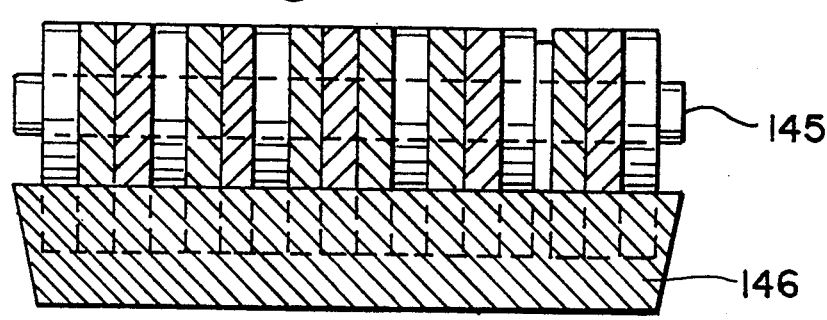
FIG. 14 is cross-sectional view taken along line 14—14 of FIG. 13.

FIGS. 12, 13 and 14 also illustrate the rocker joint in a power transmission chain for a continuously variable transmission. An example of this type of chain is described in U.S. Pat. No. 5,007,883, which is incorporated herein by reference. The chain 100, or chain-belt, includes a plurality of interleaved or laced sets of links 102, 104. Each link has a pair of spaced apertures 106, 108. The apertures are arranged so that a pivot means in the form of a single pin can join adjacent links to permit the chain to articulate. On account of the lacing, different sets of links may have different numbers of links.

Figure 15:
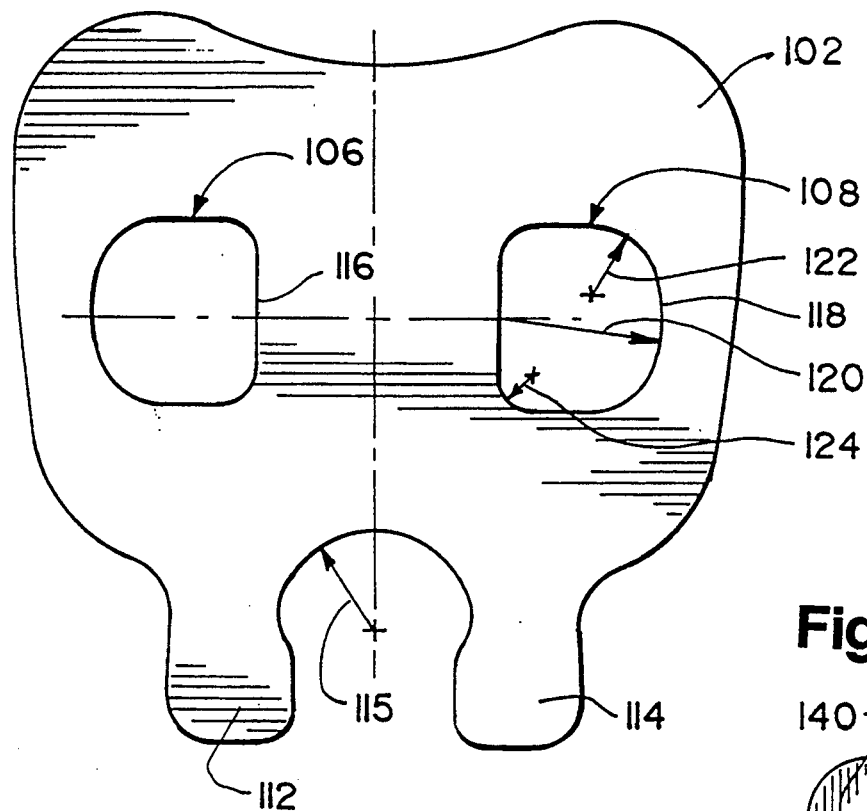
FIG. 15 is a partial elevation of a guide row link of the embodiment of FIG. 12.
Figure 16:
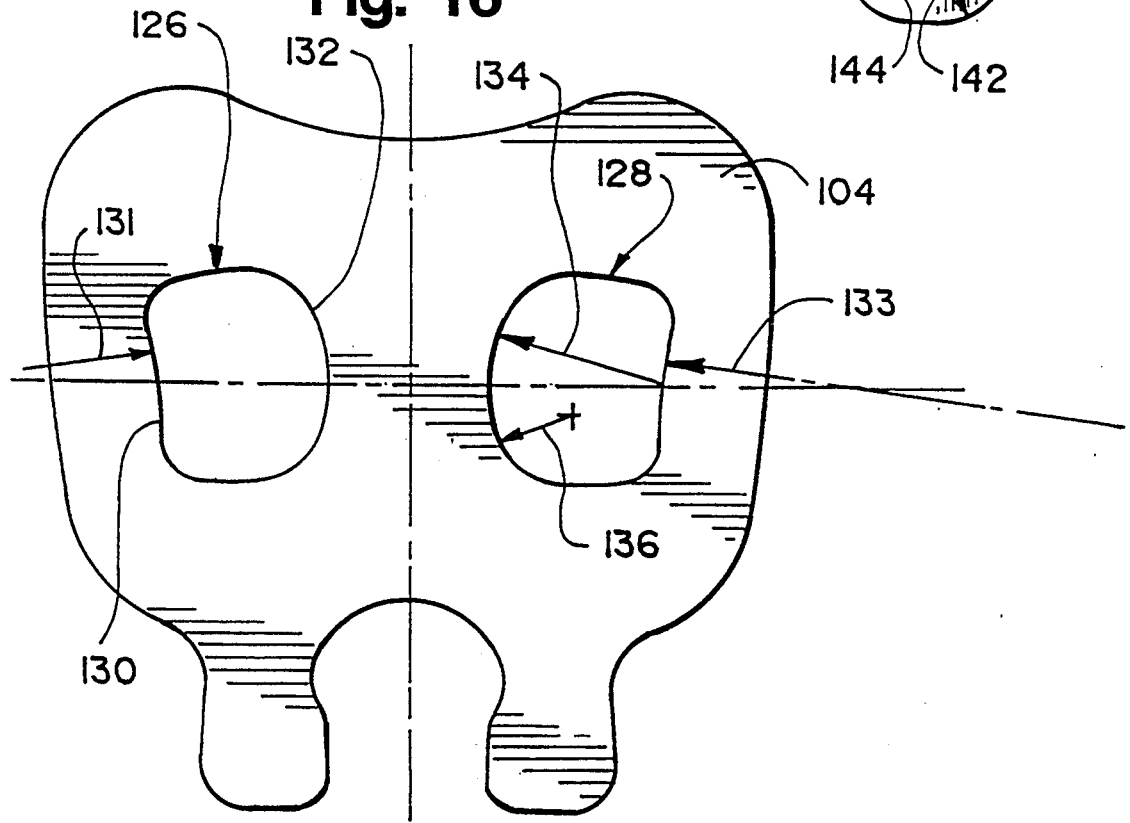
FIG. 16 is a partial elevation of a inside row link of the embodiment of FIG. 12.

The links are illustrated in detail in FIGS. 15 and 16. Each link 102 has a pair of toes 112, 114 which are downwardly disposed in a direction toward the shafts of the transmission. The toes are spaced apart and positioned to define a passageway therebetween formed by radius 115. FIG. 15 illustrates the links located in the guide row. The guide row links include apertures 106, 108 that have substantially the same shape as the cross-sectional configuration of the pin, thereby preventing rotation of the link relative to the pin. The guide row links are therefore press fit or interference fit on the pins. The apertures have a substantially straight front surface 116 and a back surface 118 that is formed by a plurality of radii 120, 122. Blend radii 124 join the front and back surfaces.

FIG. 16 illustrates the links 104 located in the non-guide row. The non-guide row links, or inside links, include apertures shaped to allow rotation of the links with respect to the pins. The apertures 126, 128 include a convexly curved front surface 130 and a curved back surface 132. The back surface is formed by radius 134 and blend radii 136. The front surfaces are formed by radii 131, 133. The apertures have a positive tilt angle with respect to the horizontal. The convex front surface is only slightly arcuate. The front surface of the pin rocks against the arcuate front surface of the inside link aperture to form the rocker joint. The centers of curvature of the radii 131, 133 of the front surfaces are on opposite sides of the apertures.

Figure 17:
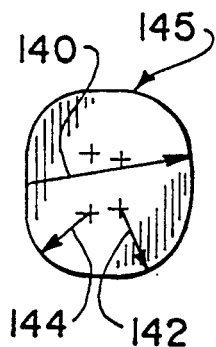
FIG. 17 is a detail of the cross-section of the pin used in the chain of FIG. 12; and, FIG. 18 is a side view of an alternate embodiment of an inside link of the chain of FIG. 12.

The pivot members are preferably in the form of pins, similar to the pin illustrated in FIG. 6. The cross-section of the pin is substantially the same as the aperture of the guide row links. The pin 145 is shown in FIG. 17, and has a back surface formed by radius 140, and radii 142, 144.

A load block 146 is associated with each set of links and is received in the passageway. The upper region of the load block has the same shape as the passageway but is only slightly smaller in size to allow the load blocks to be positioned in the passageway. The load blocks have a lower portion that extends from the passageway and has ends that are designed to engage the flanges of the pulleys of the continuously variable transmission. The load blocks are preferably formed of solid metal.

FIGS. 12 and 14 illustrate the lacing of the guide row and non-guide row links in the chain. The lacing pattern includes fewer links in the guide rows 152 than in the non-guide rows 154. This lacing decreases the contact stresses in the chain. As shown in FIGS. 12 and 14, the load blocks have a groove or notch 148 in one end. The notch is located in the block and serves to position a retaining link. The retaining link and notch serve to restrain any movement of the links in a direction transverse to the travel of the chain.

The guide rows include both external (flanking) guide links and internal (non-flanking) guide links. The non-guide rows include inside links. The guide links are press fit on the pins while the inside links rotate with respect to the pins, and form the single pin rocker joint. Unlike the silent chain joint, the CVT chain joint of FIGS. 12–14 does not allow substantial back-bending of the chain.

Figure 18:
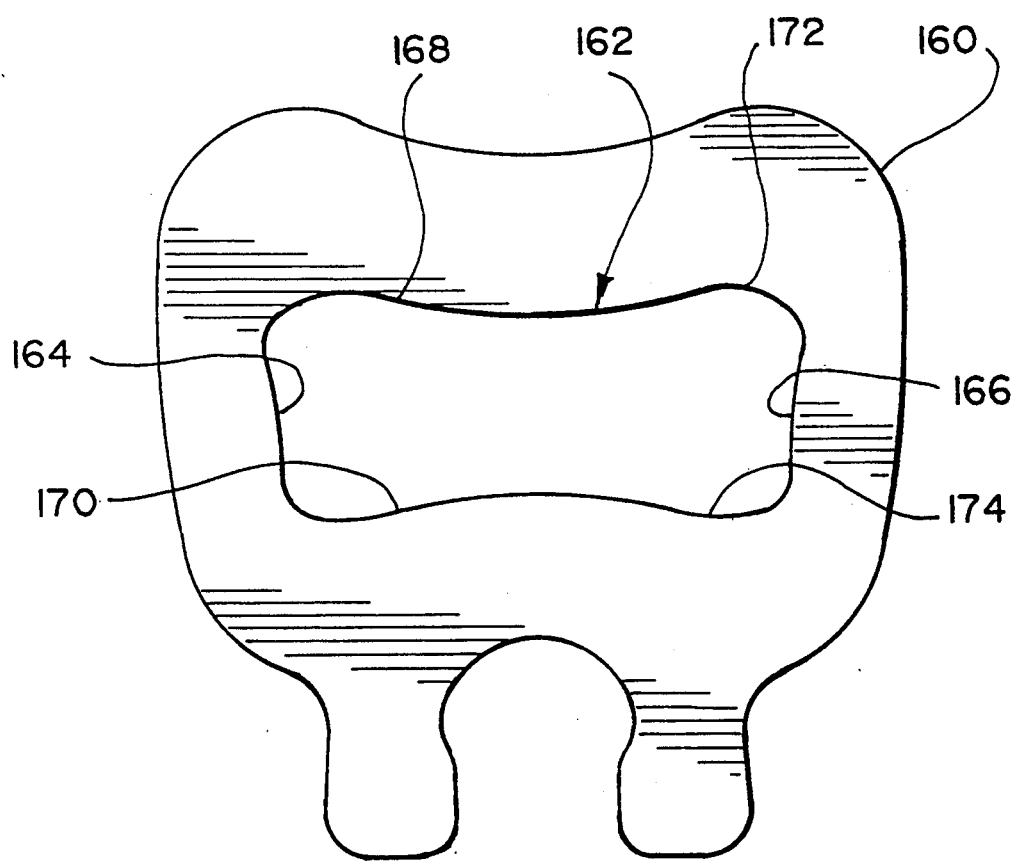

FIG. 18 illustrates an alternate embodiment of the inside link of the chain of FIG. 12. The link 160 includes a large central aperture 162. The aperture 162 includes a pair of back surfaces 164, 166 that permit rotation of the pins against the back surfaces. The large central aperture combines the two separate apertures of the link of FIG. 15. The aperture includes surfaces 168, 170, 172, 174 which are constructed to retain the pins in position to rock against the aperture back surfaces.

The combination of the rocker joint of the present chain with other types of chain and configurations of links is also possible. For example, the single pin rocker joint can be used in silent chain in which the configurations of the links are mixed.

While several embodiments of the invention have been described and illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A rocker joint for a chain constructed of an assembly of links and pivot members, the chain comprising a plurality of sets of interleaved links, each link having a pair of spaced apertures, the apertures of one link set being transversely aligned with one set of apertures of the next adjacent link set, the apertures being defined by a series of surfaces, the chain including a plurality of sets of guide row links interleaved with sets of non-guide row links, the sets of guide row links having pairs of flanking guide links located on the outside of the sets of guide row links, the apertures within the guide row links have at least one curved surface and the apertures within the non-guide row links have a plurality of curved surfaces, at least one of the non-guide row link apertures surfaces being convexly arcuate, at least some of the sets of links including a load block member oriented generally transversely to the links, the pivot member having a substantially flat front surface and a convex back surface, the back surface being defined by a plurality of radii, the pivot member being received in the apertures of the flanking guide links such that the pivot member back surface engages the curved surfaces defined by the flanking guide links thereby preventing substantial rotation of the pivot member relative to the flanking guide links, the pivot member being received in the apertures of some of the non-guide row links such that the front surface of the pivot member and the convexly arcuate surface of the non-guide row link aperture engage and rock on one another, and the back surface of the pivot member being positioned for clearance from the non-guide row link aperture back surface as the surfaces move relative to one another as the chain articulates.

2. The rocker joint of claim 1 wherein the pivot member is received in the apertures of the interleaved set of guide row links such that the pivot member back surface engages the curved aperture surfaces defined by the guide row links thereby preventing substantial rotation of the pivot member relative to said guide row links.

3. The rocker joint of claim 1 wherein said apertures of the non-guide row links include at least two convex curves, each of the convex curves being defined by a radius having a center point, the centers of the radii each being on the same side of the aperture.

4. The rocker joint of claim 3 wherein the non-guide row links include apertures having a positive tilt angle.

5. The rocker joint of claim 2 wherein the non-guide row links have a pitch length of a first distance, the guide row links having a pitch length of a different distance.

6. The rocker joint of claim 5 wherein the pitch length of the non-guide row links is greater than the pitch length of the guide row links.

7. The rocker joint of claim 1 wherein at least some sets of guide row links include a fewer number of links than some sets of non-guide row links.

8. The rocker joint of claim 2 wherein the non-guide row links include a pair of toes extending from each link and defining a passageway, the load block members being positioned in the passageways.

9. A power transmission chain constructed of an assembly of sets of interleaved links an pivot members, each link having a pair of spaced apertures, the apertures of one link set being transversely aligned with one set of apertures of the next adjacent link set, the apertures being defined by a series of surfaces, the chain including a plurality of sets of guide row links interleaved with sets of non-guide row links, the apertures within the guide row links have at least one curved surface and the apertures within the non-guide row links have a plurality of curved surfaces, at least one of the non-guide row link aperture surfaces being convexly arcuate, the sets of non-guide row links include a load block member oriented transversely to the links, the pivot members having a substantially flat front surface and a convex back surface, the pivot members being received in the apertures of each of the guide row links such that the pivot member back surface engages the curved surfaces defined by the guide row links thereby preventing substantial rotation of the pivot member relative to the guide row links, the pivot member being received in the apertures of the non-guide row links such that the front surface of the pivot member and the convexly arcuate surface of the non-guide row link aperture engage and rock on one another, the back surface of the pivot member being positioned for clearance from the non-guide row link aperture back surface as the surfaces move relative to one another as the chain articulates.

10. The power transmission chain of claim 9 wherein the load block member has at least one window to receive a plurality of links.

11. The power transmission chain of claim 9 wherein the non-guide row links include a pair of toes extending from each link, the toes defining a passageway, the load block members being positioned in the passageways.

12. The power transmission chain of claim 9 wherein some sets of guide row links include a fewer number of links than some sets of non-guide row links.

13. A rocker joint for a chain constructed of an assembly of links and pivot members, the chain comprising a plurality of sets of interleaved links, each link having a pair of spaced apertures, the apertures of one link set being transversely aligned with one set of apertures of the next adjacent link set, the apertures being defined by a series of surfaces, the chain including a plurality of sets of guide row links interleaved with sets of non-guide links, the sets of guide row links having pairs of flanking guide links located on the outside of the sets of guide row links, the apertures within the guide row links have at least one curved surface and the apertures within the non-guide row links have a plurality of curved surfaces, wherein the apertures of the non-guide row links include at least two convex curves, each of the convex curves being defined by a radius having a center point, the centers of the radii each being on the same side of the aperture, at least some of the sets of links including a load block member oriented generally transversely to the links, the pivot member having a substantially flat front surface and a convex back surface, the back surface being defined by a plurality of radii, the pivot member being received in the apertures of the flanking guide links such that the pivot member back surface engages the curved surfaces defined by the flanking guide links thereby preventing substantial rotation of the pivot member relative to the flanking guide links, the pivot member being receive din the apertures of some of the non-guide row links such that the front surface of the pivot member and the convexly arcuate surface of the inside link aperture engage and rock on one another, and the back surface of the pivot member being positioned for clearance from the non-guide row link aperture back surface as the surfaces move relative to one another as the chain articulates.

14. The rocker joint of claim 13 wherein the non-guide row links include apertures having a positive tile angle.

* * * * *

UNITED STATES PATENT AND TRADEMARK OFFICE
CERTIFICATE OF CORRECTION

PATENT NO. : 5,334,111
DATED : August 2, 1994
INVENTOR(S) : Edward H. Cole et al.

It is certified that error appears in the above-indentified patent and that said Letters Patent is hereby corrected as shown below:

On the Title Page

In column 2 after "Attorney, Agent, or Firm", delete "Willian, Brinks Olds" and substitute --Willian Brinks Hofer Gilson & Lione--.

Col. 12, In claim 13, line 39, delete "receive din" and substitute --received in--.

Col. 12, In claim 14, line 49, delete "tile" and substitute --tilt--.

Signed and Sealed this

Twenty-fourth Day of October, 1995

Attest:

BRUCE LEHMAN

*Attesting Officer*    *Commissioner of Patents and Trademarks*